(12) United States Patent
Sarkar et al.

(10) Patent No.: US 8,788,327 B2
(45) Date of Patent: Jul. 22, 2014

(54) LOCAL AD SERVING

(75) Inventors: Subhadip Sarkar, Sunnyvale, CA (US);
Deepak Chandra, Mountain View, CA (US); Jonathan Wall, San Francisco, CA (US)

(73) Assignee: Google Inc., Mountain View, CA (US)

( * ) Notice: Subject to any disclaimer, the term of this patent is extended or adjusted under 35 U.S.C. 154(b) by 442 days.

(21) Appl. No.: 13/009,790

(22) Filed: Jan. 19, 2011

(65) Prior Publication Data

US 2012/0185334 A1     Jul. 19, 2012

(51) Int. Cl.
*G06Q 30/00* (2012.01)
*G06Q 30/02* (2012.01)

(52) U.S. Cl.
CPC ........ *G06Q 30/0251* (2013.01); *G06Q 30/0269* (2013.01); *G06Q 30/0261* (2013.01)
USPC ...................................................... 705/14.1

(58) Field of Classification Search
CPC ...................................................... G06Q 90/00
USPC ...................................................... 705/14.1
See application file for complete search history.

(56) References Cited

U.S. PATENT DOCUMENTS

| 6,522,875 B1 * | 2/2003 | Dowling et al. ........... 455/414.3 |
| 2010/0080163 A1 | 4/2010 | Krishnamoorthi et al. |

FOREIGN PATENT DOCUMENTS

| JP | 2010-531626 | 9/2010 |
| KR | 10-2010-0061851 | 6/2010 |
| KR | 10-2010-0097754 | 9/2010 |
| KR | 10-2011-0003462 | 1/2011 |

OTHER PUBLICATIONS

International Search Report mailed Aug. 29, 2012 from related PCT Application No. PCT/US2012/021765, 12 pages.
Authorized officer Simin Baharlou, International Preliminary Report on Patentability in PCT/US2012/021765, mailed Aug. 1, 2013, 6 pages.

* cited by examiner

*Primary Examiner* — Daniel Lastra
(74) *Attorney, Agent, or Firm* — Fish & Richardson P.C.

(57) ABSTRACT

In general, this specification relates to content presentation. The subject matter of this specification can be embodied in, among other things, methods that include the actions of receiving a group of content items at a user device, the content items configured for presentation to a user in association with other content, each content item of the group of content items including metadata associated with the content item; identifying a request from an application of the user device to present a content item in association with particular content; selecting, using one or more processors, a content item from the group of content items using the metadata for the content items along with local targeting information; and presenting the selected content item.

44 Claims, 5 Drawing Sheets

LOCAL AD SERVING

BACKGROUND

The present disclosure relates to content presentation.

Advertisers provide advertisements in different forms in order to attract consumers. Ads can be provided in electronic form. For example, online ads can be provided as banner ads on a web page, as ads presented with search results, or as ads presented in a mobile application.

An advertising system can include an ad in a webpage, for example, in response to one or more keywords in a user search query input to a search engine. If a user selects the presented ad (e.g., by "clicking" the ad), the user is generally taken to another location associated with the ad, for example, to another, particular document.

SUMMARY

In general, this specification relates to content presentation.

In general, one aspect of the subject matter described in this specification can be embodied in methods that include the actions of receiving a group of content items at a user device, the content items configured for presentation to a user in association with other content, each content item of the group of content items including metadata associated with the content item; identifying a request from an application of the user device to present a content item in association with particular content; selecting, using one or more processors, a content item from the group of content items using the metadata for the content items along with local targeting information; and presenting the selected content item. Other embodiments of this aspect include corresponding systems, apparatus, and computer programs recorded on computer storage devices, each configured to perform the operations of the methods.

These and other embodiments can each optionally include one or more of the following features. The content item is an advertisement. The method further includes periodically requesting a new group of content items from a remote server. A request for a group of content items includes user device information. A frequency of the periodic requesting varies according to network speed. A frequency of the periodic requesting varies according to utilization of the previously received group of content items. A frequency of the periodic requesting occurs in response to a change in client device location.

The metadata associated with a content item includes one or more categories to which the content item is assigned. The metadata associated with a content item includes content item targeting information. The metadata associated with a content item includes restrictions for presenting the content item. The metadata associated with a content item includes historical performance information for the content item. The method further includes notifying a remote server when a content item is presented to the user. The method further includes notifying a remote server of user interactions with a presented content item.

The method further includes using an ad serving application on the client device to select the content item. Selecting the content item includes comparing, on the client device, one or more keywords associated with one or more content items of the group of content items with one or more keywords of the request. Selecting the content item includes comparing, on the client device, one or more keywords associated with one or more content items of the group of content items with a location of the client device. The local targeting information includes a location of the client device. The local targeting information includes ad targeting information maintained only on the client device.

In general, one aspect of the subject matter described in this specification can be embodied in methods that include the actions of receiving a request from a mobile device for a group of content items, the group of content items for selective presentation by the mobile device to a user in association with other content, the request including information associated with the user or mobile device; selecting, using one or more processors, a group of content items using the request information; and sending the group of content items to the mobile device, the content items including targeting information associated with each respective content item. Other embodiments of this aspect include corresponding systems, apparatus, and computer programs recorded on computer storage devices, each configured to perform the operations of the methods.

These and other embodiments can each optionally include one or more of the following features. The method further includes receiving a notification indicating that a content item of the group of content items has been selected for presentation; and logging the presentation of the content item. Selecting the group of content items further includes using user profile data. Selecting the group of content items is performed without receiving local targeting information maintained on the mobile device.

The systems and techniques described here may provide one or more of the following advantages. Ads can be prefetched and served with reduced latency to a user of a mobile device using a local ad serving application running on the mobile device as compared to requesting an ad from a remote location (e.g., a remote ad server). Privacy related information, such as accurate location data, can be determined locally to target ads while being maintained on a user's mobile device. In particular, device location can be used in ad targeting without sending the device location externally. Ads can be served when a device has no or limited network connectivity. Additionally, the local ad serving application can use a user's recent activity in targeting ads. User's interaction with presented ads (e.g., clicks, downloads, etc.) can be stored locally and sent to the remote ad server (e.g., contemporaneously with the interaction or at a later time).

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

In some examples, a mobile device contains a local repository of content items. One or more content items can be downloaded and/or updated from an ad server (e.g., in background processes) prior to presenting particular content items on the mobile device. When a content item is requested, the mobile device (e.g., using a local ad serving application) can identify a particular content item from among the content items in the local repository of content items in for presentation. The content items in the local repository can be displayed by applications, including as part of a document in applications, on the mobile device, with browser content displayed on a mobile device browser, or along with other content.

While reference will be made below to advertising systems and methods, other forms of content including other forms of sponsored content can be managed, presented, and tracked in accordance with the description below.

Figure 1:
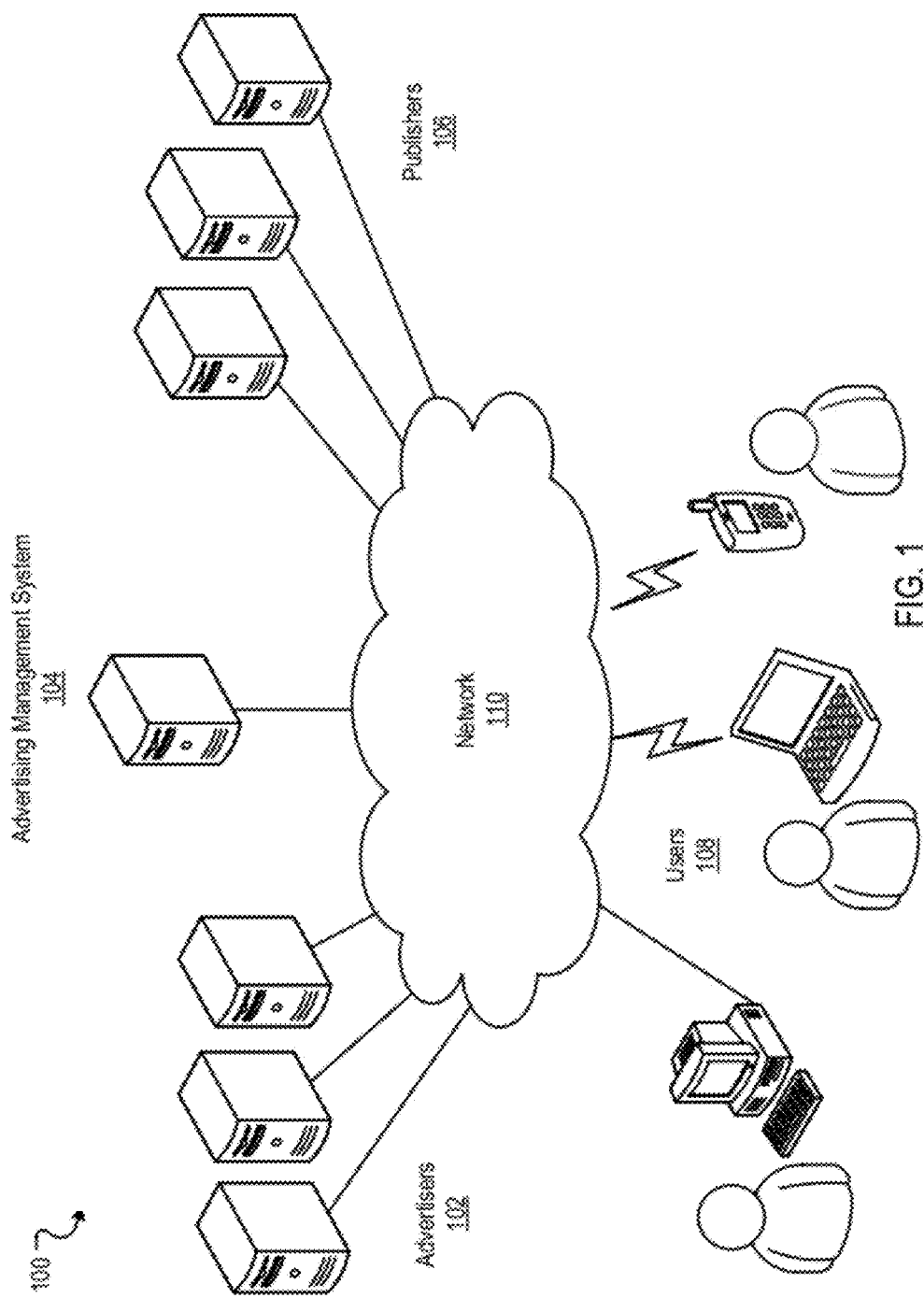
FIG. 1 is a diagram of an example content presentation system.

FIG. 1 is a block diagram of an example content presentation system 100. In some implementations, one or more advertisers 102 can directly, or indirectly, enter, maintain, and track ad information in an advertising management system 104 ("system 104"). Though reference is made to advertising, other forms of content, including other forms of sponsored content, can be delivered by the system 100. The ads can be in the form of graphical ads, such as banner ads, text only ads, image ads, barcode ads (e.g., ads that include one or more barcodes, for example, for use in redeeming the particular ad), audio ads, video ads, animated ads, ads combining one or more of any of such components, etc. The ads can also include embedded information, such as links, meta-information, and/or machine executable instructions. One or more users 108 may submit requests for ads to the system 104. The system 104 responds by sending ads to the requesting users 108 for placement on or association with one or more of a publisher's 106 content items (e.g., web properties, mobile applications, or other third party content). Example web properties can include web pages, television and radio advertising slots, or print media space.

Users 108 and the advertisers 102, can provide usage information to the system 104, such as, for example, whether or not a conversion (e.g., a purchase or other interaction) or a click-through related to an ad (e.g., a user has selected an ad) has occurred. This usage information can include measured or observed user behavior related to ads that have been served. The system 104 may perform financial transactions, for example, crediting the publishers 106 and charging the advertisers 102 based on the usage information.

A network 110, such as a local area network (LAN), wide area network (WAN), the Internet, one or more telephony networks or a combination thereof, connects the advertisers 102, the system 104, the publishers 106, and the users 108.

One example publisher 106 is a general content server that receives requests for content (e.g., articles, discussion threads, music, video, graphics, search results, web page listings, information feeds, etc.), and retrieves the requested content in response to the request.

The user 108 can submit a request for ads to an advertisement server in the system 104. The ad request can include a number of ads desired. The ad request can also include content request information, including information associated with the user 108 or the user's device (e.g., a mobile device), as described in greater detail below.

In some implementations, a client browser, application, or other content provider, combines the requested content with one or more of the ads provided by the system 104. The combined content and ads can be rendered to the users 108 that requested the content for presentation in a viewer (e.g., a browser, application interface, or other content display system) of a user device. The user device can transmit information about the ads back to the advertisement server, including information describing how, when, and/or where the ads are to be rendered (e.g., in HTML or JavaScript™).

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results. In some implementations, the search results can be presented to users with one or more ads.

A user 108, or the user's device, can submit a request for ads to the system 104. The request may include a number of ads desired. The system 104 can use various information to identify a group of ads to provide to the user 108. Ads from this group of ads can be provided by the user's device for presentation in response to a request from a user application, or associated with content to be displayed (e.g., a web page or search results). Thus, ads can be provided directly to the user device for presentation or indirectly through content provided to the user device (e.g., ads presented with search results where the ads are provided to the user with the search results).

In some implementations, the advertisement management system 104 can use an auction process to select ads from the advertisers 102, which can then be provided to the users 108 in response to the receive requests for ads. For example, the advertisers 102 may be permitted to select, or bid, an amount the advertisers are willing to pay for each presentation of or interaction with (e.g., click) of an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The user 108 can combine the search results with one or more of the ads provided by the system 104. This combined information can then be displayed by the devices of the users 108 that requested the content. Alternatively, portions can be received at different times and integrated in the display as received. For example, the ads can be received and rendered separately by a browser or application. The search results can be maintained as distinct from the ads, so as not to confuse the user between paid ads and presumably neutral search results.

In some implementations, one or more publishers 106 provide web properties to the users 108. The users 108 submit requests for ads to the advertising management system 104. The system 104 responds by sending ads to the requesting users 108 for placement on one or more web properties (e.g., websites and other network-distributed content) that are relevant to the web property. In some implementations, the user's device identifies a particular ad from the received ads for presentation with the provided web properties. In some implementations, the requests are executed by devices associated with the user 108, e.g., by the execution of a particular script (e.g., javascript) when the publisher's web page is loading on a client device.

Another example publisher 106 is a mobile application developer. A mobile application is an application specifically designed for operation on a mobile device (e.g., a smart phone). The mobile application can also include ads positioned within the content of the mobile application. Similar to publishers 106 described above, the ads can be received from the advertising management system 104 for placement in the mobile application when accessed by a user (e.g., when a particular page of a mobile application is loaded on the mobile device).

Figure 2:
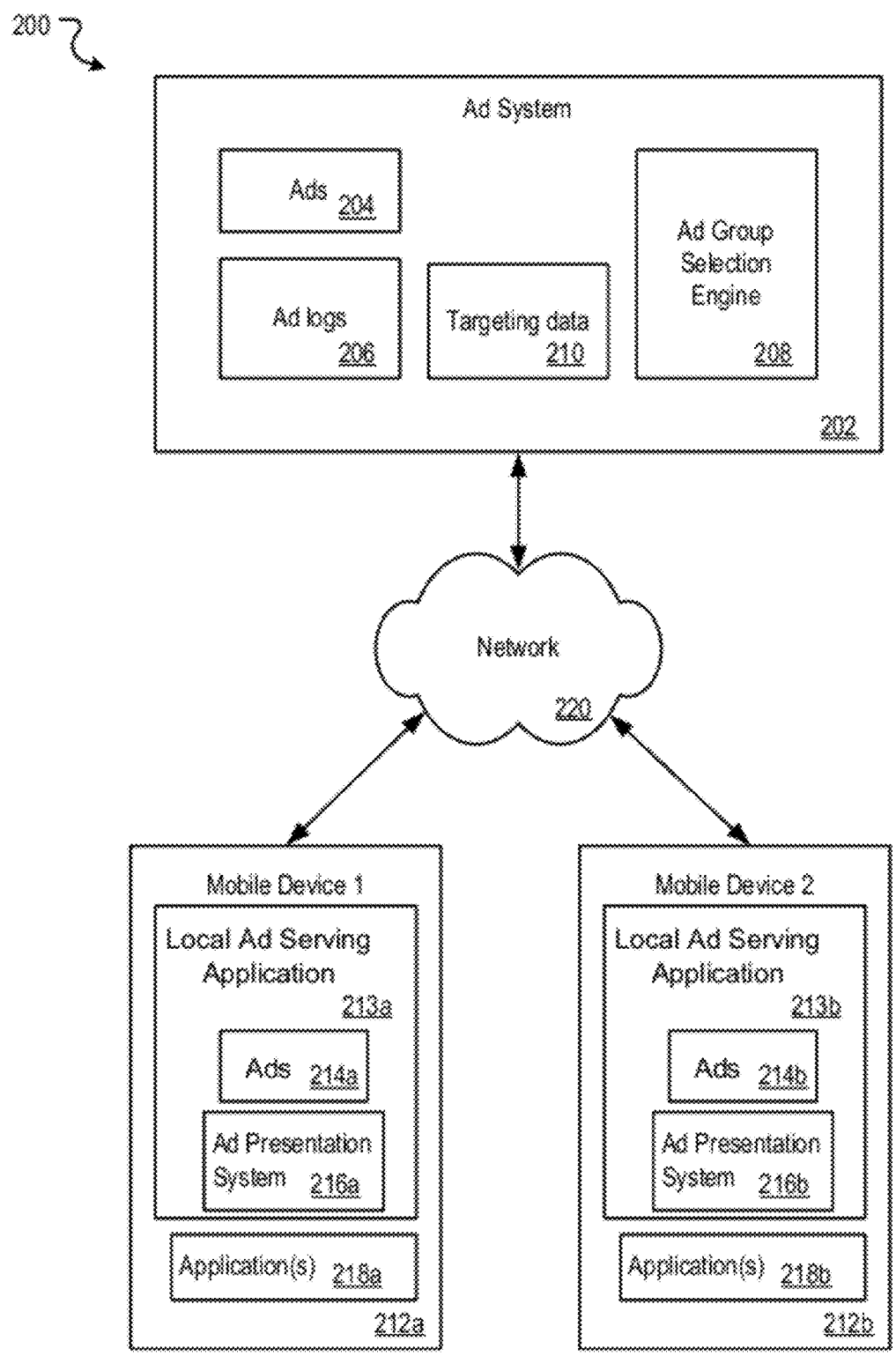
FIG. 2 is a block diagram of an example system for storing and displaying ads.

FIG. 2 is a block diagram of an example system 200 for storing and displaying ads. The system 200 includes a remote ad system 202, mobile devices 212 to display the ads, and a network 220. Mobile devices 212 can include a local ad serving application or a service integrated into the mobile operating system of the mobile device that requests groups of ads, store the ads, and display selected ads from the groups of ads at a later time.

The remote ad system 202 can contain components for storing, recording, and presenting ads. An ad repository 204 can store ads submitted by advertisers. Ad logs 206 can store ad presentation and conversion events (e.g., users an ad is presented to, timestamps, ad identifiers, etc.), as well as user's interaction with a presented ad, e.g., user ad clicks. An ad group selection engine 208 can select a group of ads to provide to a mobile device (e.g., to the local ad serving application or service integrated with the operating system of the mobile device) based on information in a request, as well as based on targeting data 210 stored on the remote ad system 202. Example requests can include information identifying the requesting user or the requesting device. In some implementations, this information is matched to targeting data 210 associated with the user, though any particularly user identifying information can preferably be rendered anonymous (e.g., using randomly generated identifiers) to remove any information that can particularly identify a specific individual.

The targeting data 210 can include user information such as demographic information about the user, profile data, previous ads selected for a user, and general location information. General location information, for example locating a user within a city or county instead of a street address, can allow for user privacy and use of ads in a greater geographic area. In particular, the ads can be more closely targeted to the user's location by the user's device as described in greater detail below. In some examples, additional or updated user information can be included in requests for stored ads and added to the targeting data 210 for purposes of processing the request. For example, applications or application categories in use by the user's mobile device can be included such that ads matching those applications can be identified.

However, local targeting information, for example, particular user location information, can be maintained on the respective mobile device only (e.g., mobile device 212a) and not provided to the remote ad system 202. The local targeting information can be used in local ad serving by a local ad serving application (e.g., local ad serving application 213a).

The remote ad system 202 can respond to a request for stored ads, from a mobile device 212, by selecting a group of ads from the ad repository 204. The selected group of ads, and additional information associated with the ads, can be transmitted to the same mobile device 212. In some implementations, the information or metadata associated with the ads is encrypted prior to sending to the mobile device 212. In some implementations, the remote ad system 202 treats these ad requests distinctly from other ad requests. For example, impressions in response to the request for a group of ads are not logged or counted until notification has been received that the ads have been delivered or presented to the user. The additional information can include targeting information such as keywords for each ad, advertiser restrictions, presentation format, historical performance information, and location associations. Advertiser information provided can include an advertiser's bid (per ad) and overall budget information. The advertiser information can also include delivery restrictions, for example, time of day and ad rotation scheme. In addition, estimated quality/match scores and priority of delivery for particular ads can also be provided.

A mobile device, e.g., mobile device 212a can include a local ad serving application 213a that includes a local ad repository 214a to store ads and additional information associated with ads and an ad presentation system 216a. The local ad serving application 213a can be an application downloaded by the user in order to opt-in or can be preloaded on the mobile device 212a. In some implementations, the local ad serving is provided as a service provided by the mobile device operating system. One or more applications 218a can display ads selected from the local ad repository 214a. The applications 218a request ads from the local ad serving application 213a that can be selected from the local ad repository 214a by the ad presentation system 216a. The applications 218a include both mobile applications developed to provide particular features or content to the user (e.g., games, news applications, etc.), as well as one or more mobile device browser applications.

The ad presentation system 216a of the local ad serving application 213a uses information associated with ads (e.g., keywords, demographic/location ad targets), device information (e.g., current device location), and information associated with the local ad request (e.g., search query, application information, etc.) to select an ad from the local ad repository 214a to present. For example, when an ad request is associated with an ad to be displayed with search results in a browser interface, the ad request can include the query submitted to a search system. This query can be matched to ads based on keywords as well as locations associated with the ads. In particular, the mobile device 212a can use local targeting information including the precise location of the mobile device 212a (and/or other privacy sensitive data that can be retained locally) in identifying an ad responsive to a local ad request without transmitting the precise location information external to the mobile device (e.g., to the ad system 202).

In some examples, the ad presentation system 216a can determine that none of the ads in the local ad repository 214a match, or match closely enough, an ad request. In some of these examples, the mobile device 212a can request one or more ads from the remote ad system 202. Mobile device 212b similarly includes a local ad serving application 213b including a local ad repository 214b and ad presentation system 216b, and applications 218b.

In some examples, the ad server (e.g., a local ad serving application or operating system service) on the mobile devices 212a and 212b can request stored ads from the remote ad system 202 in response to an event or change in state. For example, the mobile device 212a can request stored ads periodically according to particular schedule (e.g., once every twenty four hours), when the number of unseen ads stored in the ads repository 214a falls below a predetermined threshold, or when the mobile device 212a moves into a new geographic area. Additionally, the mobile device 212a can request stored ads when a data connection is idle, when a new user logs into the mobile device, or when a new application is installed. In some alternative implementations, ads are requested at device startup. In some implementations, one or more ads are requested when a suitable ad to present is not identified in response to a request (e.g., no locally stored ads match the selection criteria for the ad request).

Figure 3:
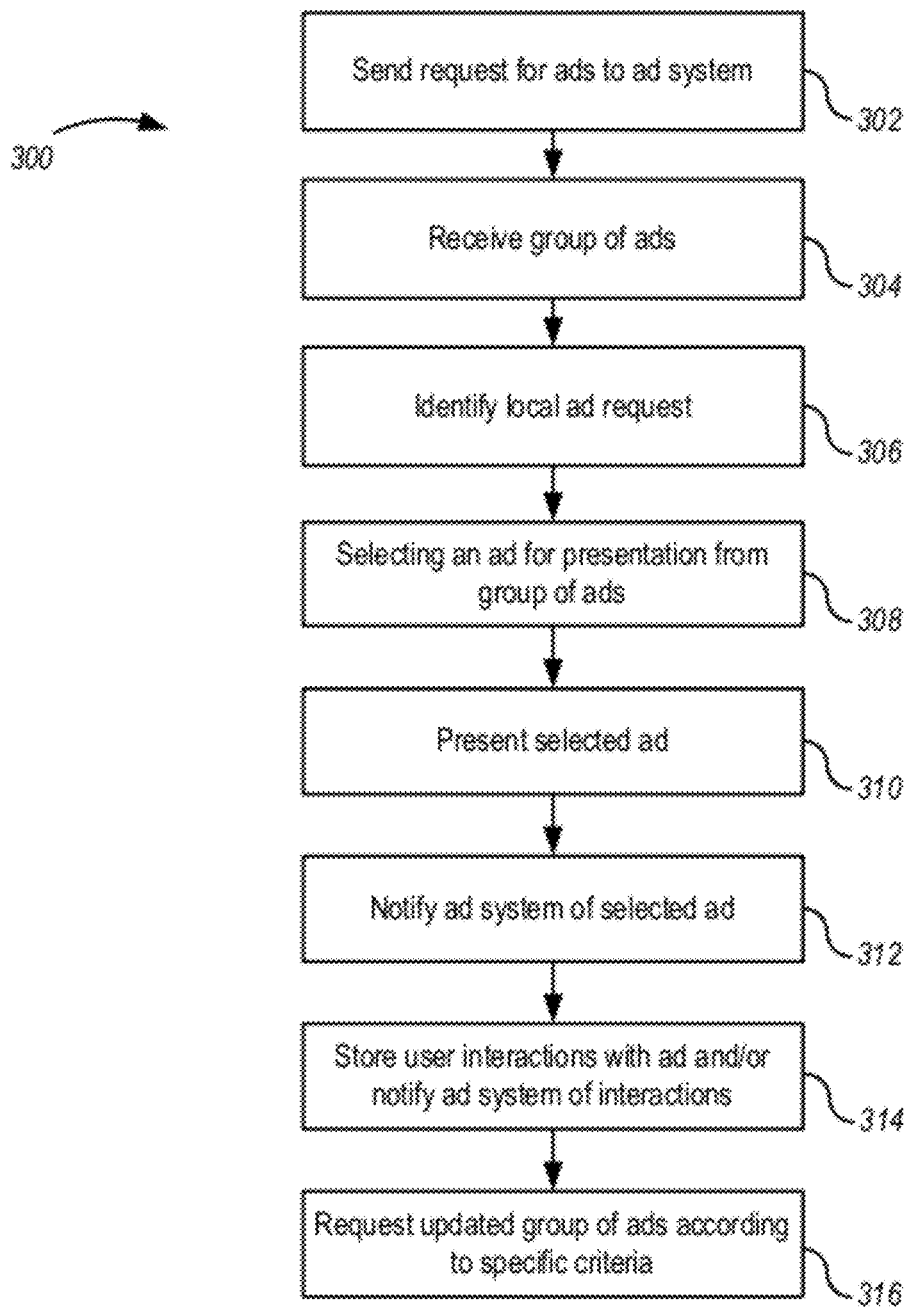
FIG. 3 is a flowchart of an example method for selecting ads for presentation from a locally stored group of ads.

FIG. 3 is a flowchart of an example method 300 for selecting ads for presentation from a locally stored group of ads. In some examples, the method 300 can be performed by a processor executing instructions in a computer-readable storage medium. For example, the method 300 can be performed by a mobile device, for example, by an application or service integrated into the operating system of the mobile device (e.g., local ad serving application 213a of mobile device 212a).

A request for a group of ads is sent (302) to an ad system. The request can be sent from a user device, for example, a mobile device (e.g., from the local ad serving application). The request can include additional information for identifying the user and/or device generating the request as well as information to aid in selecting targeted ads for the group of ads. For example, the additional information can include an identifier associated with the user's device (e.g., a device hardware identifier, IP address, or other identifying information) or an identifier associated with the user. However, the request may not include particular local ad targeting information maintained on a client device. This can allow increased user privacy by limiting information provided to an ad system.

The group of ads is received (304). The received group of ads can be stored, for example, in an ad cache on the mobile device (e.g., an ad repository of the local ad serving application). Ads in the group of ads can be stored or made available for presentation, according to particular criteria. For example, ads in the group of ads can have an expiration date, be replaced by other ads, and/or reach a predetermined limited number of impressions to the user. In some examples, the receiving the group of ads includes receiving additional information associated with the received ads. For example, the additional information can include keywords associated with the advertisements, advertiser restrictions, presentation format, historical performance information, and location associations. The information can be used in selecting a particular ad or ads from the group of ads for presentation.

A local ad request is received (306). In particular, an ad request can be received from an application executing on the mobile device. For example, an application running in the mobile device (e.g., a news application, game application, or other type of mobile application) can send a request to the mobile device for an ad to display along with particular application content. The application content can include placeholders for receiving one or more advertisements when that content is displayed. In another example, a web browser can load a web page that includes one or more placeholders for displaying ads. The browser, in rendering the web page, search results, or other web content can request one or more ads. The request is routed locally instead of to a remote ad server. For example, the local ad serving application (e.g., local ad serving application 213a of FIG. 2) can receive the request.

The request can include information to aid in identifying one or more ads responsive to the request. For example, the request can include information associated with the content to be presented (e.g., the query used to generate search results, a category of a mobile application being executed, etc.). In some examples, an application can request a local ad in response to an input such as user input (e.g., requesting a new page.)

An ad is selected (308) for presentation from the group of ads that are locally stored. The ad can be selected from the group of ads based on information including targeting information provided with the ads, information provided with the ad request, as well as information local to the mobile device, such as the particular location of the mobile device, time of day, etc. In some implementations, if an ad is not identified from the group of ads (e.g., because none of the stored ads satisfied the criteria for selection), an ad request is made to a remote ad system.

For example, targeting information associated with one or more of the ads in the group of ads can be compared with information associated with the request including or in addition to local targeting information. For example, the request can include one or more keywords that are compared with keywords associated with ads of the group of ads. In another example, the local targeting information can include a particular location associated with the user (e.g., a GPS location of the user device). This location can be compared with location targets associated with particular ads during ad selection (e.g., to identify an ad matching the user's location). This location matching can be performed without providing the user's location to an external ad server. Other local targeting information can be similarly used in isolation from an ad server, e.g., particular user demographic information or preferences are not sent to the ad system but instead can be used to target ads locally.

The selected ad is presented (310) to the user. In some examples, the ad is displayed by the requesting application in an area specified for ads. In some examples, the ad is displayed as part of downloaded content, such as web content.

A notification is sent (312) to the remote ad system in response to the ad selection. For example, a message can be generated by the mobile device when an ad from the group of ads is selected or displayed. Additionally, in some implementations, if a user interacts with or selects the ad, the message can be updated or a second message can be generated. In some examples, the message or messages can be sent to the ad system when they are created, or as soon as possible if the mobile device's data connection is already in use, or if a connection is unavailable (e.g., offline use). In some examples, messages can be collected and cached, for example to be sent as a group when the mobile device is otherwise idle.

User interactions can be stored and/or notifications of interactions can be sent to the remote ad system (314). User interactions with the presented ad can include user selections e.g., user clicks) or other ad interactions available for the particular ad. The user interactions can also include downloads of additional content in response to the ad selection. The user interactions can be stored and transmitted to the remote ad system. The user interaction information can be transmitted concurrently in time with the user interaction or at a later time (e.g., according to a schedule or based on available connectivity to the network). The remote ad system can store these user interactions as well as process them to generate ad statistics or other usage information. This user interaction information can be anonymized such that the particular user providing the interaction is obscured.

An updated group of ads is requested (316) according to particular update criteria. For example, the update criteria can include an elapsed amount of time or at a particular time (e.g., once at the end of a block of a number of hours or day since a previous group of ads was requested or at least once every number of hours or days), an expiration of the existing group of ads, a number of ads served from an existing group of ads (e.g., including a number of ads of a particular type such as location based, text, or with a keyword), or available network speed. In some examples, unused ads stored on the mobile device are prioritized higher than newly requested ads. In some examples, unused ads stored on the mobile device are discarded when the requested updated group of ads is received.

Although a particular number, type, and order of steps are described here, it will be understood that alternative numbers, orders, and types are possible. For example, a mobile device may contain no stored ads. When a request for local ads is received (306), the mobile device local ad serving application can send (302) a request for ads to the ad system.

Figure 4:
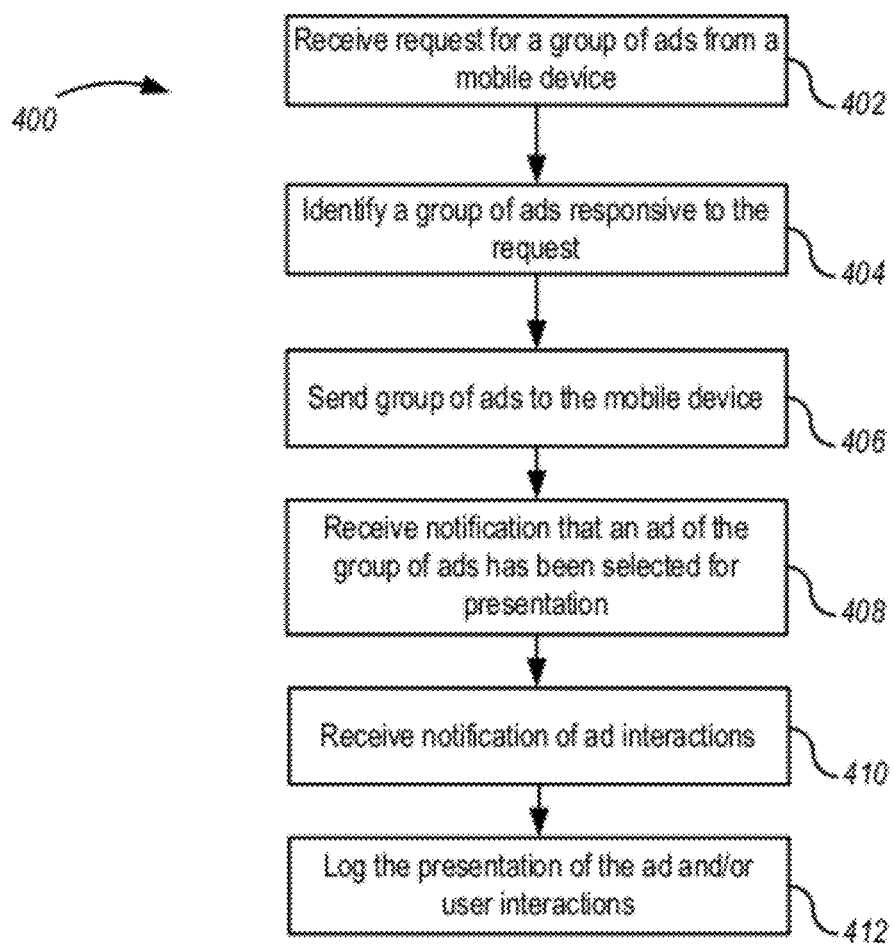
FIG. 4 is a flowchart of an example method for providing a group of ads to a mobile device.

FIG. 4 is a flowchart of an example method 400 for providing a group of ads to a device (e.g., a mobile device). In some examples, the method 400 can be performed by a processor executing instructions in a computer-readable storage medium. For example, the method 400 can be performed by a remote ad system (e.g., the remote ad system 202).

A request for a group of ads is received (402) from a user device (e.g., from a local ad serving application or operating system service on the mobile device). In some implementations, the request includes identifying the user device sending the request, for example, with device specific information or user specific information (e.g. a device identifier or user identifier). The request can also include further information about the user and/or device such as location, usage history, or installed applications.

A group of ads responsive to the request are identified (404). In some implementations, information from the request and/or stored targeting information about the requesting user and/or device (e.g., user profile, demographic data) are used to identify the group of ads.

The identified group of ads are sent (406) to the user device. In some implementations, the group of ads is sent immediately, or nearly immediately, after the step 404. In some implementations, the group of ads is temporarily stored in an outgoing message buffer, for example, until the user device sends a second message indicating sufficient idle data bandwidth to receive the group of ads. The group of ads can include additional ad information, for example, information used to identify relevant ads for display (e.g., keywords associated with each ad). In some implementations, the group of ads is sent for storage in an ad repository of a local ad serving application on the mobile device.

A notification that an ad of the group of ads has been selected for presentation is received (408). For example, a message can be received indicating time, location, and context of a selection for presentation. The notification can include an identification of the ad and/or the user device presenting the ad. In some examples, the notification is included in a request for a new group of ads.

Additional notifications can be received identifying user ad interactions (410). In particular, ad interactions by the user with ads form the group of ads that are presented to the user can be sent by the mobile device. The interaction notifications can be received individually or in groups. The received notifications can be logged for further processing.

The presentation of the ad is logged (412). For example, each presentation of an ad can be logged as an impression event. The details of the impression event are collected and stored in one or more logs associated with the user, the user's device, the ad, associated publishers, and/or associated advertisers. Additionally, in some implementations, additional notifications are received and logged. For example, if a user selects a presented ad or interacts with the ad in a particular way (e.g., to log conversion associated with presented ads).

Figure 5:
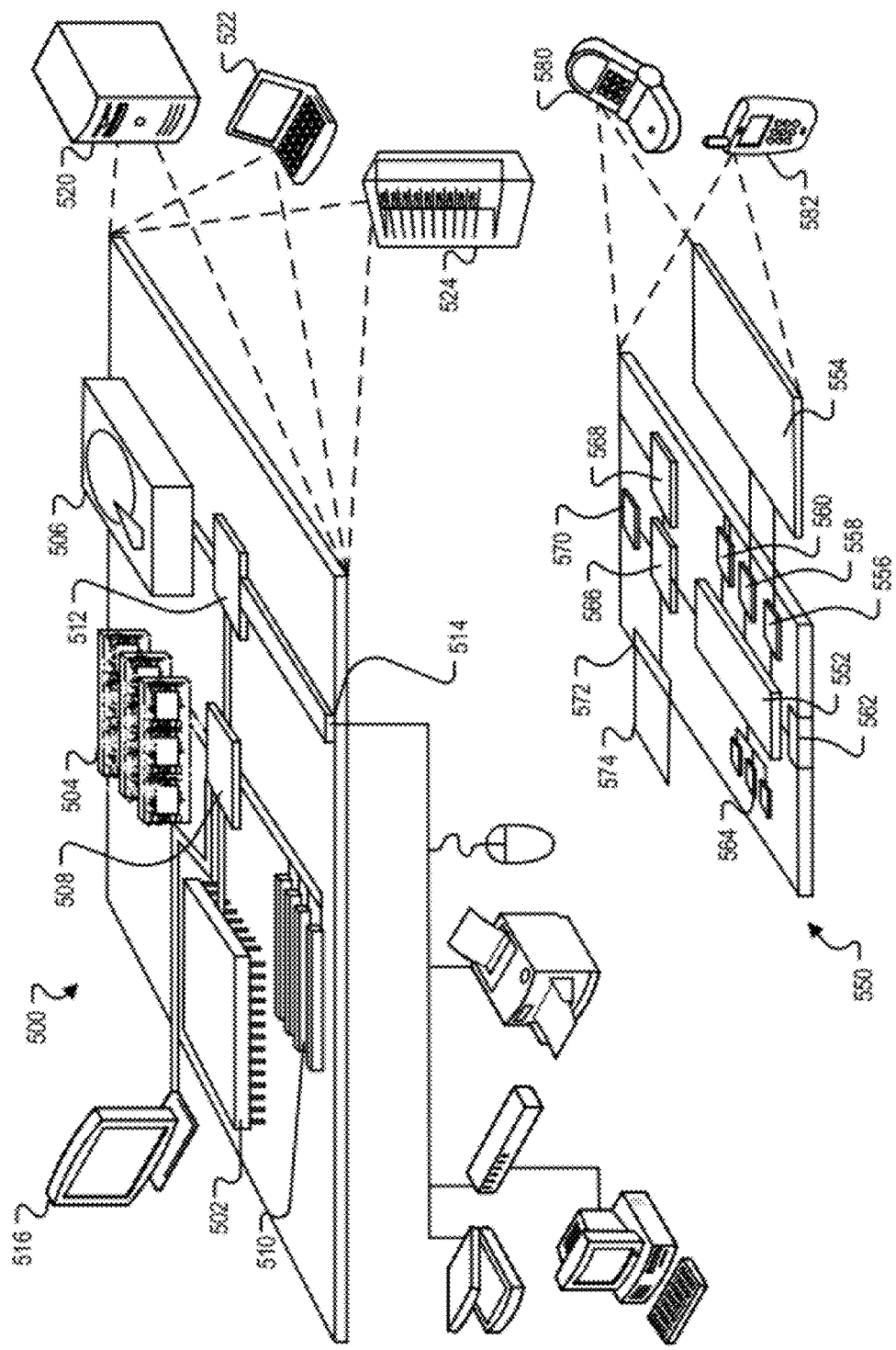
FIG. 5 shows an example of a computing device and a mobile computing device that can be used in connection with computer-implemented methods and systems described in the present specification.

FIG. 5 shows an example of a computing device 500 and a mobile computing device that can be used to implement the techniques described herein the present specification. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 can also be another form of computer-readable medium, such as a magnetic or optical disk.

The storage device 506 is capable of providing mass storage for the computing device 500. In some implementations, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which can accept various expansion cards (not shown). In the implementation, the low-speed interface 512 is coupled to the storage device 506 and the low-speed expansion port 514. The low-speed expansion port 514, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 520, or multiple times in a group of such servers. In addition, it can be implemented in a personal computer such as a laptop computer 522. It can also be implemented as part of a rack server system 524. Alternatively, components from the computing device 500 can be combined with other components in a mobile device (not shown), such as a mobile computing device 550. Each of such devices can contain one or more of the computing device 500 and the mobile computing device 550, and an entire system can be made up of multiple computing devices communicating with each other.

The mobile computing device 550 includes a processor 552, a memory 564, an input/output device such as a display 554, a communication interface 566, and a transceiver 568, among other components. The mobile computing device 550 can also be provided with a storage device, such as a microdrive or other device, to provide additional storage. Each of the processor 552, the memory 564, the display 554, the communication interface 566, and the transceiver 568, are interconnected using various buses, and several of the components can be mounted on a common motherboard or in other manners as appropriate.

The processor 552 can execute instructions within the mobile computing device 550, including instructions stored in the memory 564. The processor 552 can be implemented as a chipset of chips that include separate and multiple analog and digital processors. The processor 552 can provide, for example, for coordination of the other components of the mobile computing device 550, such as control of user interfaces, applications run by the mobile computing device 550, and wireless communication by the mobile computing device 550.

The processor 552 can communicate with a user through a control interface 558 and a display interface 556 coupled to the display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can provide communication with the processor 552, so as to enable near area communication of the mobile computing device 550 with other devices. The external interface 562 can provide, for example, for wired communication in some implementations, or for wireless communication in other implementations, and multiple interfaces can also be used.

The memory 564 stores information within the mobile computing device 550. The memory 564 can be implemented as one or more of a computer-readable medium or media, a volatile memory unit or units, or a non-volatile memory unit or units. An expansion memory 574 can also be provided and connected to the mobile computing device 550 through an expansion interface 572, which can include, for example, a SIMM (Single In Line Memory Module) card interface. The expansion memory 574 can provide extra storage space for the mobile computing device 550, or can also store applications or other information for the mobile computing device 550. Specifically, the expansion memory 574 can include instructions to carry out or supplement the processes described above, and can include secure information also. Thus, for example, the expansion memory 574 can be provided as a security module for the mobile computing device 550, and can be programmed with instructions that permit secure use of the mobile computing device 550. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 can communicate wirelessly through the communication interface 566, which can include digital signal processing circuitry where necessary. The communication interface 566 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 568 using a radio-frequency. In addition, short-range communication can occur, such as using a Bluetooth, WiFi, or other such transceiver (not shown). In addition, a GPS (Global Positioning System) receiver module 570 can provide additional navigation- and location-related wireless data to the mobile computing device 550, which can be used as appropriate by applications running on the mobile computing device 550.

The mobile computing device 550 can also communicate audibly using an audio codec 560, which can receive spoken information from a user and convert it to usable digital information. The audio codec 560 can likewise generate audible sound for a user, such as through a speaker, e.g., in a handset of the mobile computing device 550. Such sound can include sound from voice telephone calls, can include recorded sound (e.g., voice messages, music files, etc.) and can also include sound generated by applications operating on the mobile computing device 550.

The mobile computing device 550 can be implemented in a number of different forms, as shown in the figure. For example, it can be implemented as a cellular telephone 580. It can also be implemented as part of a smart-phone 582, personal digital assistant, or other similar mobile device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a group of content items at a user device, the content items configured for presentation to a user in association with other content, each content item of the group of content items including metadata associated with the content item, wherein the received group of content items are stored in a local repository on the user device;
   identifying a request from an application of the user device to present a content item in association with particular application content, wherein the request includes information associated with the application content for use in identifying a content item responsive to the request;
   selecting, using one or more processors, a content item from the group of previously received content items in the local repository using the metadata for the content items, the information associated with the application content, and local targeting information, wherein the local targeting information is maintained on the user device;
   presenting the selected content item along with the particular application content; and
   notifying a remote server when the selected content item is presented to the user.

2. The method of claim 1, where the content item is an advertisement.

3. The method of claim 1, further comprising:
   periodically requesting a new group of content items from a remote server.

4. The method of claim 3, where a request for a group of content items includes user device information.

5. The method of claim 3, where a frequency of the periodic requesting varies according to network speed.

6. The method of claim 3, where a frequency of the periodic requesting varies according to utilization of the previously received group of content items.

7. The method of claim 3, where a frequency of the periodic requesting occurs in response to a change in client device location.

8. The method of claim 1, where the metadata associated with a content item includes one or more categories to which the content item is assigned.

9. The method of claim 1, where the metadata associated with a content item includes content item targeting information.

10. The method of claim 1, where the metadata associated with a content item includes restrictions for presenting the content item.

11. The method of claim 1, where the metadata associated with a content item includes historical performance information for the content item.

12. The method of claim 1, further comprising:
    notifying a remote server of user interactions with a presented content item.

13. The method of claim 1, further comprising using an ad serving application on the client device to select the content item.

14. The method of claim 1, where selecting the content item includes comparing, on the client device, one or more keywords associated with one or more content items of the group of content items with one or more keywords of the request.

15. The method of claim 1, where selecting the content item includes comparing, on the client device, one or more keywords associated with one or more content items of the group of content items with a location of the client device.

16. The method of claim 1, where the local targeting information includes a location of the client device.

17. The method of claim 1, where the local targeting information includes ad targeting information maintained only on the client device.

18. A method comprising:
    receiving a request from a mobile device for a group of content items, the group of content items for selective presentation by the mobile device to a user in association with other content, the request including information associated with the user or mobile device;
    selecting, using one or more processors, a group of content items using the request information;
    sending the group of content items to the mobile device, the content items including targeting information associated with each respective content item, and
    receiving a notification indicating that a content item of the group of content items has been selected for presentation on the mobile device.

19. The method of claim 18, further comprising:
    logging the presentation of the content item.

20. The method of claim 18, where selecting the group of content items further includes using user profile data.

21. The method of claim 18, where selecting the group of content items is performed without receiving local targeting information maintained on the mobile device.

22. A system comprising:
    one or more computing devices operable to perform operations comprising:
    receiving a group of content items at a user device, the content items configured for presentation to a user in association with other content, each content item of the group of content items including metadata associated with the content item, wherein the received group of content items are stored in a local repository on the user device;
    identifying a request from an application of the user device to present a content item in association with particular application content, wherein the request includes information associated with the application content for use in identifying a content item responsive to the request;

selecting a content item from the group of previously received content items in the local repository using the metadata for the content items, the information associated with the application content, and local targeting information, wherein the local targeting information is maintained on the user device;

presenting the selected content item along with the particular application content; and notifying a remote server when the selected content item is presented to the user.

23. The system of claim 22, where the content item is an advertisement.

24. The system of claim 23, further operable to perform operations comprising:

periodically requesting a new group of content items from a remote server.

25. The system of claim 23, where a request for a group of content items includes user device information.

26. The system of claim 23, where a frequency of the periodic requesting varies according to network speed.

27. The system of claim 23, where a frequency of the periodic requesting varies according to utilization of the previously received group of content items.

28. The system of claim 23, where a frequency of the periodic requesting occurs in response to a change in client device location.

29. The system of claim 22, where the metadata associated with a content item includes one or more categories to which the content item is assigned.

30. The system of claim 22, where the metadata associated with a content item includes content item targeting information.

31. The system of claim 22, where the metadata associated with a content item includes restrictions for presenting the content item.

32. The system of claim 22, where the metadata associated with a content item includes historical performance information for the content item.

33. The system of claim 22, further operable to perform operations comprising:

notifying a remote server of user interactions with a presented content item.

34. The system of claim 22, further comprising using an ad serving application on the client device to select the content item.

35. The system of claim 22, where selecting the content item includes comparing, on the client device, one or more keywords associated with one or more content items of the group of content items with one or more keywords of the request.

36. The system of claim 22, where selecting the content item includes comparing, on the client device, one or more keywords associated with one or more content items of the group of content items with a location of the client device.

37. The system of claim 22, where the local targeting information includes a location of the client device.

38. The system of claim 22, where the local targeting information includes ad targeting information maintained only on the client device.

39. A system comprising:

one or more computing devices operable to perform operations comprising:

receiving a request from a mobile device for a group of content items, the group of content items for selective presentation by the mobile device to a user in association with other content, the request including information associated with the user or mobile device;

selecting a group of content items using the request information;

sending the group of content items to the mobile device, the content items including targeting information associated with each respective content item; and receiving a notification indicating that a content item of the group of content items has been selected for presentation on the mobile device.

40. The system of claim 39, further operable to perform operations comprising:

receiving a notification indicating that a content item of the group of content items has been selected for presentation; and logging the presentation of the content item.

41. The system of claim 39, where selecting the group of content items further includes using user profile data.

42. The system of claim 39, where selecting the group of content items is performed without receiving local targeting information maintained on the mobile device.

43. A computer storage medium encoded with a computer program, the program comprising instructions that when executed by data processing apparatus cause the data processing apparatus to perform operations comprising:

receiving a group of content items at a user device, the content items configured for presentation to a user in association with other content, each content item of the group of content items including metadata associated with the content item, wherein the received group of content items are stored in a local repository on the user device;

identifying a request from an application of the user device to present a content item in association with particular application content, wherein the request includes information associated with the application content for use in identifying a content item responsive to the request;

selecting a content item from the group of previously received content items in the local repository using the metadata for the content items, the information associated with the application content, and local targeting information, wherein the local targeting information is maintained on the user device;

presenting the selected content item along with the particular application content; and notifying a remote server when the selected content item is presented to the user.

44. A computer storage medium encoded with a computer program, the program comprising instructions that when executed by data processing apparatus cause the data processing apparatus to perform operations comprising:

receiving a request from a mobile device for a group of content items, the group of content items for selective presentation by the mobile device to a user in association with other content, the request including information associated with the user or mobile device;

selecting a group of content items using the request information;

sending the group of content items to the mobile device, the content items including targeting information associated with each respective content item, and receiving a notification indicating that a content item of the group of content items has been selected for presentation on the mobile device.

* * * * *

UNITED STATES PATENT AND TRADEMARK OFFICE
CERTIFICATE OF CORRECTION

| | | Page 1 of 1 |
|---|---|---|
| PATENT NO. | : 8,788,327 B2 | |
| APPLICATION NO. | : 13/009790 | |
| DATED | : July 22, 2014 | |
| INVENTOR(S) | : Sarkar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 275 days.

Signed and Sealed this
Tenth Day of May, 2016

Michelle K. Lee
*Director of the United States Patent and Trademark Office*